(12) United States Patent
Perko et al.

(10) Patent No.: US 9,249,593 B2
(45) Date of Patent: Feb. 2, 2016

(54) SYSTEMS FOR ELEVATING A BUILDING STRUCTURE ABOVE GRADE, AND RELATED METHODS

(71) Applicant: Magnum Piering, Inc., West Chester, OH (US)

(72) Inventors: Howard A. Perko, Fort Collins, CO (US); Bernard Brian Dwyer, Cincinnati, OH (US)

(73) Assignee: Magnum Piering, Inc., West Chester, OH (US)

( * ) Notice: Subject to any disclaimer, the term of this patent is extended or adjusted under 35 U.S.C. 154(b) by 0 days.

(21) Appl. No.: 14/224,369

(22) Filed: Mar. 25, 2014

(65) Prior Publication Data

US 2014/0290154 A1  Oct. 2, 2014

Related U.S. Application Data

(60) Provisional application No. 61/805,943, filed on Mar. 28, 2013.

(51) Int. Cl.
*E04H 9/14* (2006.01)
*E04G 23/06* (2006.01)
*E02D 27/48* (2006.01)

(52) U.S. Cl.
CPC .............. *E04H 9/145* (2013.01); *E02D 27/48* (2013.01); *E04G 23/065* (2013.01)

(58) Field of Classification Search
CPC ........ E04H 9/145; E02D 27/48; E04G 23/065
USPC ........ 52/126.5, 294–297, 299, 274, 283, 646, 52/648.1, 650.1, 653.1, DIG. 3, 848, 73; 403/170–172, 176, 217; 248/346.01
See application file for complete search history.

(56) References Cited

U.S. PATENT DOCUMENTS

| | | | | |
|---|---|---|---|---|
| 1,355,536 A | * | 10/1920 | Caskey | 52/295 |
| 2,477,256 A | * | 7/1949 | Kneas | 52/73 |
| 2,690,074 A | * | 9/1954 | Jones | 52/167.1 |
| 2,909,901 A | * | 10/1959 | Suderow | 405/199 |
| 3,108,403 A | * | 10/1963 | Jackson | 52/169.9 |
| 3,349,527 A | * | 10/1967 | Bruns | 52/169.9 |
| 3,708,933 A | * | 1/1973 | Yang | 52/236.4 |
| 4,119,176 A | * | 10/1978 | Verdu | 182/138 |
| 4,125,973 A | * | 11/1978 | Lendrihas | 249/188 |
| 4,235,559 A | * | 11/1980 | Rooklyn | 403/262 |

(Continued)

OTHER PUBLICATIONS http://strongtie.com/products/strongframe/index.asp# printed Jun. 19, 2014 (1 page).

(Continued)

*Primary Examiner* — Brent W Herring
(74) *Attorney, Agent, or Firm* — Wood, Herron & Evans, LLP

(57) ABSTRACT

A building structure is supported above a foundation and above grade by a moment frame comprising a plurality of columns and beams. The columns are all generally similar and the beams are all generally similar, such that each column can be attached with up to four beams. The moment frame is secured to a foundation, which may include pilings extending downwardly into the ground. The foundation can include a concrete foundation member or a foundation framework comprising a plurality of attachment members secured together by beams. The pilings can include helical flighting.

49 Claims, 12 Drawing Sheets

(56) References Cited

U.S. PATENT DOCUMENTS

| | | | | |
|---|---|---|---|---|
| 4,541,219 A | * | 9/1985 | Parker | 52/713 |
| 4,604,838 A | * | 8/1986 | Remington et al. | 52/73 |
| 4,621,938 A | * | 11/1986 | Weilow | 403/217 |
| 5,044,137 A | * | 9/1991 | Shigeru et al. | 52/286 |
| 5,255,489 A | * | 10/1993 | Matsumoto et al. | 52/745.17 |
| 5,412,913 A | * | 5/1995 | Daniels et al. | 52/79.13 |
| 5,678,375 A | * | 10/1997 | Juola | 52/655.1 |
| 5,727,358 A | * | 3/1998 | Hayashi et al. | 52/745.2 |
| 5,826,386 A | * | 10/1998 | Casteel | 52/236.3 |
| 6,192,636 B1 | * | 2/2001 | Hayashi et al. | 52/126.7 |
| 6,219,989 B1 | * | 4/2001 | Tumura | 52/838 |
| 6,739,099 B2 | * | 5/2004 | Takeuchi et al. | 52/167.1 |
| 7,310,920 B2 | * | 12/2007 | Hovey, Jr. | 52/655.1 |
| 7,637,076 B2 | * | 12/2009 | Vaughn | 52/838 |
| 7,762,038 B2 | * | 7/2010 | Ceba et al. | 52/653.1 |
| 7,874,120 B2 | * | 1/2011 | Ohata et al. | 52/655.1 |
| 8,011,156 B1 | * | 9/2011 | Schwan | 52/653.1 |
| 8,146,322 B2 | * | 4/2012 | Karns | 52/655.1 |
| 8,291,678 B2 | * | 10/2012 | William | 52/849 |
| 8,474,204 B2 | * | 7/2013 | Pan et al. | 52/259 |
| 8,826,629 B1 | * | 9/2014 | Brindle | 52/745.17 |
| 2002/0184836 A1 | * | 12/2002 | Takeuchi et al. | 52/167.1 |
| 2007/0209314 A1 | * | 9/2007 | Vaughn | 52/720.1 |
| 2010/0071315 A1 | * | 3/2010 | Hong | 52/848 |
| 2011/0308190 A1 | * | 12/2011 | Pryor et al. | 52/653.1 |

OTHER PUBLICATIONS http://www/fema.gov/residential-coastal-construction#1 printed Jun. 19, 2014 (2 pages).
Strong Frame © moment Frames, brochure, Simpson Strong-Tie Company Inc. C-SF13 12/12 exp. Jun. 2015 (116 pages).

* cited by examiner

SYSTEMS FOR ELEVATING A BUILDING STRUCTURE ABOVE GRADE, AND RELATED METHODS

RELATED APPLICATION

This application claims the benefit of U.S. Provisional Application No. 61/805,943, filed Mar. 28, 2013, the content of which is hereby incorporated by reference in its entirety.

FIELD OF THE INVENTION

The present invention generally relates to support structures used to support building structures, and more particularly to frameworks for supporting building structures above grade.

BACKGROUND

Many building structures are supported above ground level, or above grade. For example, many homes in coastal areas and regions susceptible to flooding are supported above grade in order to position the home at a height sufficient to reduce the risk of damage from flooding. Recent destructive storms have prompted governmental agencies to focus on the risks associated with flooding for building structures. For example, following Hurricane Sandy in 2012, the United States Federal Emergency Management Agency (FEMA) updated its Advisory Base Flood Elevation (ABFE) information. The ABFE information identifies the minimum recommended elevation that a building structure must be above sea level.

Building codes have been updated to take account of FEMA's updated ABFE information, and impose construction requirements relating to the minimum elevation for a building structure. The National Flood Insurance Program (NFIP) has also updated its insurance requirements and rates based on FEMA's updated ABFE information. These changes to building codes and insurance programs impact existing building structures and new building structure construction. For example, an owner of an existing building structure may be required to elevate the building structure in order to qualify for or receive a lower rate for flood insurance under the NFIP. And a prospective owner of a new building structure will be required to have the building structure constructed so that it is at an appropriate elevation above sea level.

Various support structures have been used to elevate building structures, but they tend to suffer from various drawbacks, and these drawbacks can become magnified when trying to accommodate higher flood elevation requirements.

SUMMARY

The present invention provides a moment frame support structure system with which to support building structures above grade, such as to satisfy current flood elevation requirements, while also reducing or eliminating the drawbacks of other support structures which have been used. To that end, and in accordance with one aspect of the present invention, a moment frame to support a building structure thereon includes (a) at least four vertically disposed columns each having a base at one end for coupling to a foundation and at the other end a support ledge and a generally square upper fixture defining four attachment faces and (b) at least four horizontally disposed beams each having an attachment flange at respective ends thereof and adapted to be supported on a column support ledge and mate with an attachment face of a column so as to interconnect the columns. Advantageously, the attachments flanges of the beams and attachment faces of the columns have corresponding patterns of bolt-receiving apertures such that either attachment flange of any one of the beams and any one of the attachment faces of any one of the columns can be placed into confronting relationship, with a plurality of the apertures of the confronting attachment flange and attachment face aligned in order to be secured together by bolts received in one or more of the aligned apertures.

The resulting moment frame provides support against lateral forces in all directions with each corner of the moment frame including a column that supports at least two beams in a manner that places the shear stress on the ledge so that the attachment flange and attachment face can be secured together with only a few bolts.

In accordance with another aspect of the present invention, a moment frame having at least four vertically disposed columns and at least four horizontally disposed beams interconnected with the columns is situated on a foundation that includes pilings extending downwardly into the ground, with a base of each column secured to the foundation. Advantageously, the pilings include helical flighting, and such pilings may be referred to as helical piles. The combination of a moment frame and a foundation including pilings provides a reliable support structure against the forces of storms and other flooding. Advantageously, the pilings extend deep enough into the ground so as to support the moment frame even if some of the ground beneath the moment frame is eroded away by adverse conditions, such as wave action.

The foundation can include a concrete member formed at or slightly below grade, with the columns being secured to the concrete member. Pilings, if present, can extend downwardly from the concrete member into the ground. In some embodiments, pile caps of the pilings are embedded in the concrete member when the concrete member is formed and used to secure the moment frame columns to the pilings. Alternatively or additionally, the foundation can include a foundation framework that includes a plurality of attachment members connected by beams, with the columns being secured to the attachment members. The attachment members are also secured to pilings extending downwardly from the attachment members into the ground. In particular, each attachment member has a lower plate that is secured with a pile cap plate of a pile cap of a piling that extends downwardly into the ground.

In accordance with a yet further aspect of the present invention, components of the moment frame may be provided as a kit unassembled for easy transport to a site location. The moment frame may be assembled on site and either used to support an already existing building structure at the site and over which it has been lifted while the moment frame has been installed or a new building structure built atop the moment frame. At the site, the foundation is prepared, if necessary, and the columns are secured to the foundation. The beams are secured to the columns to thereby form the moment frame. A building structure is set atop, dropped down onto, or built atop the moment frame. A sill plate could be included between the beams of the moment frame and the building structure.

By virtue of the foregoing, there is thus provided a moment frame support structure system with which to support building structures above grade, such as to satisfy current flood level requirements, while also reducing or eliminating the drawbacks of other support structures which have been used.

These and other advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

Figure 1:
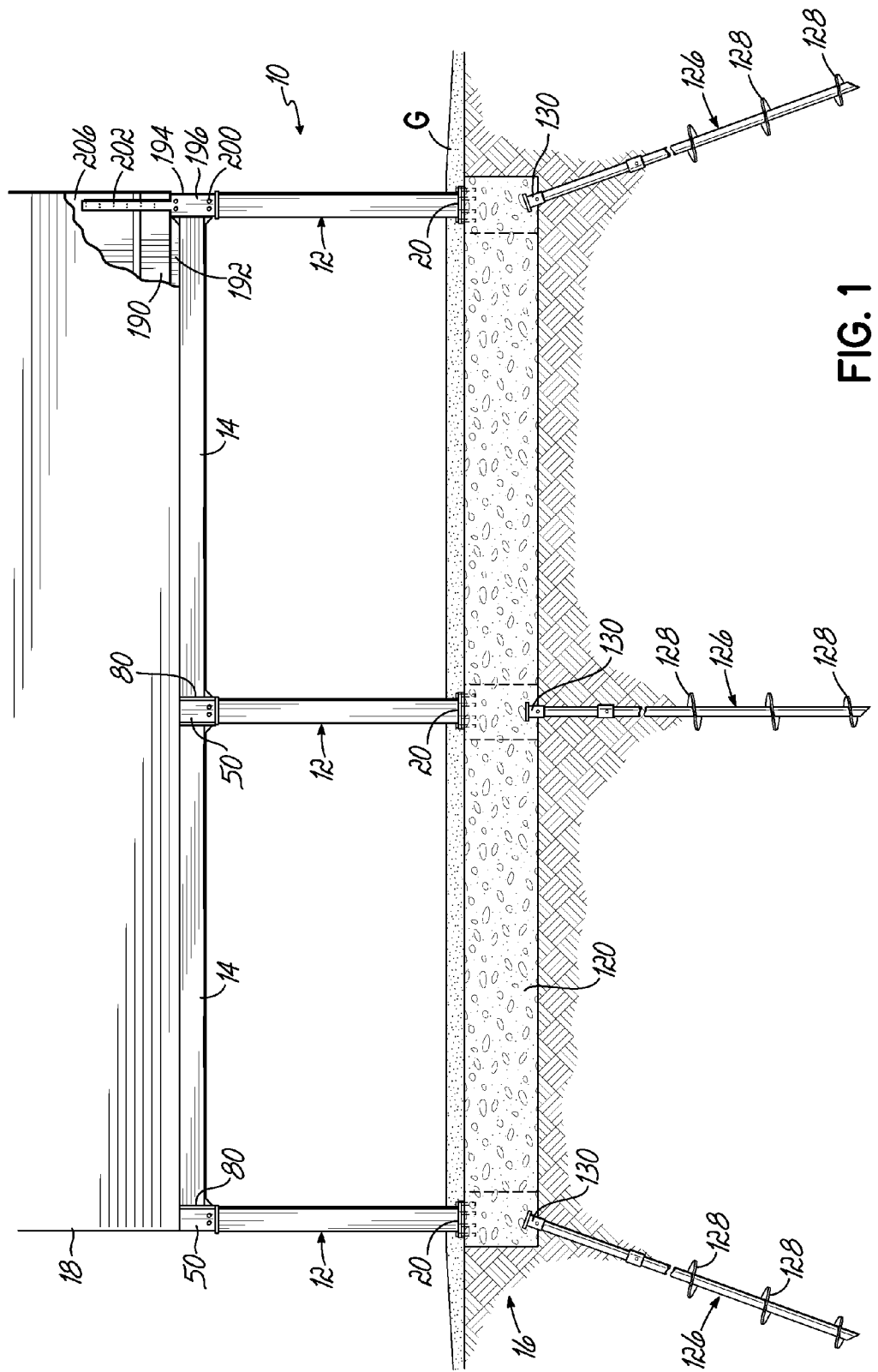
FIG. 1 is a schematic view in partial cross section showing a building structure elevated above a foundation and above grade by a moment frame in accordance with the principles of the present invention.
Figure 2A:
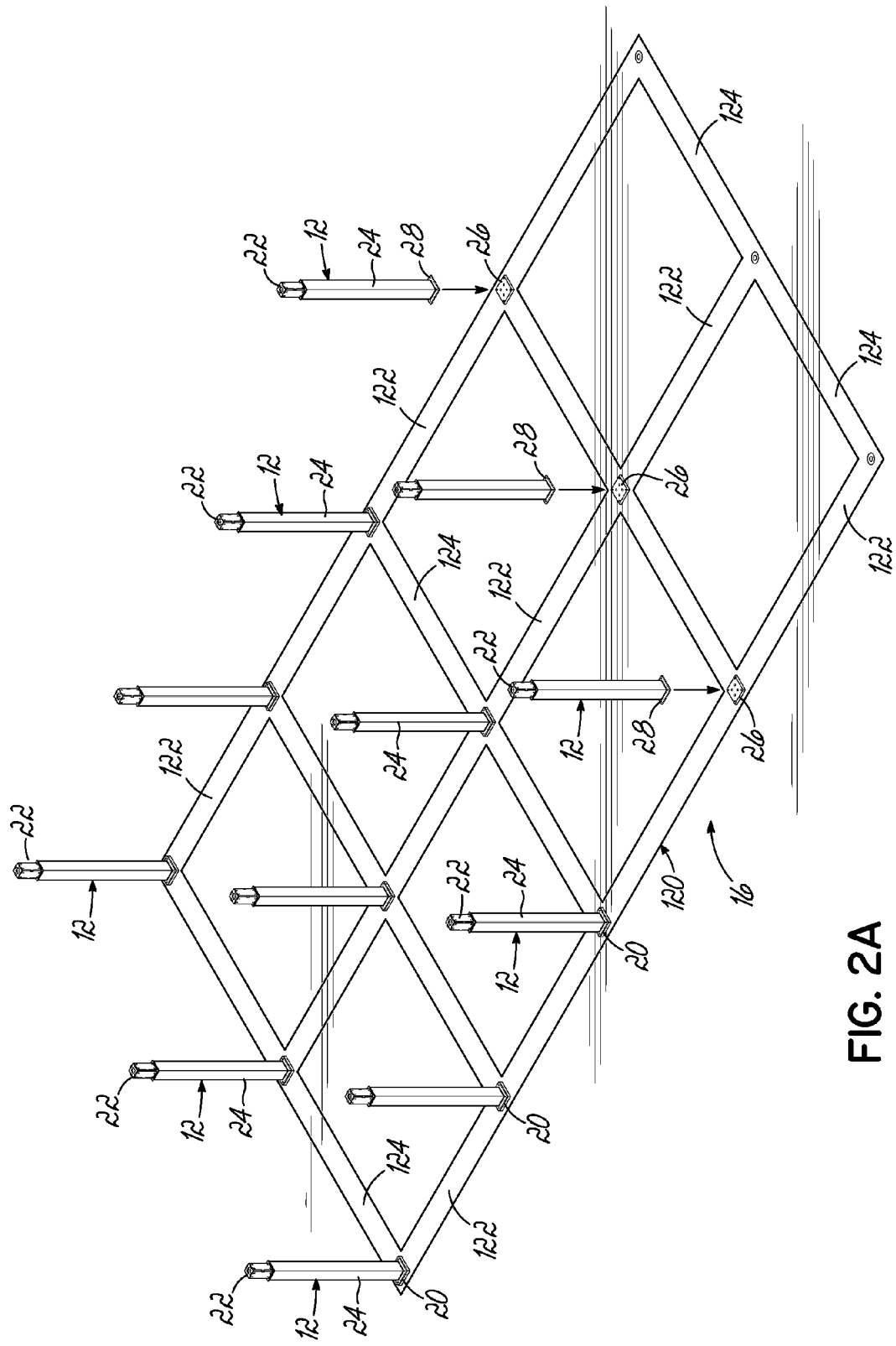
FIG. 2A is an isometric view of columns of a moment frame, and shows the coupling of columns with a concrete foundation member.
Figure 2B:
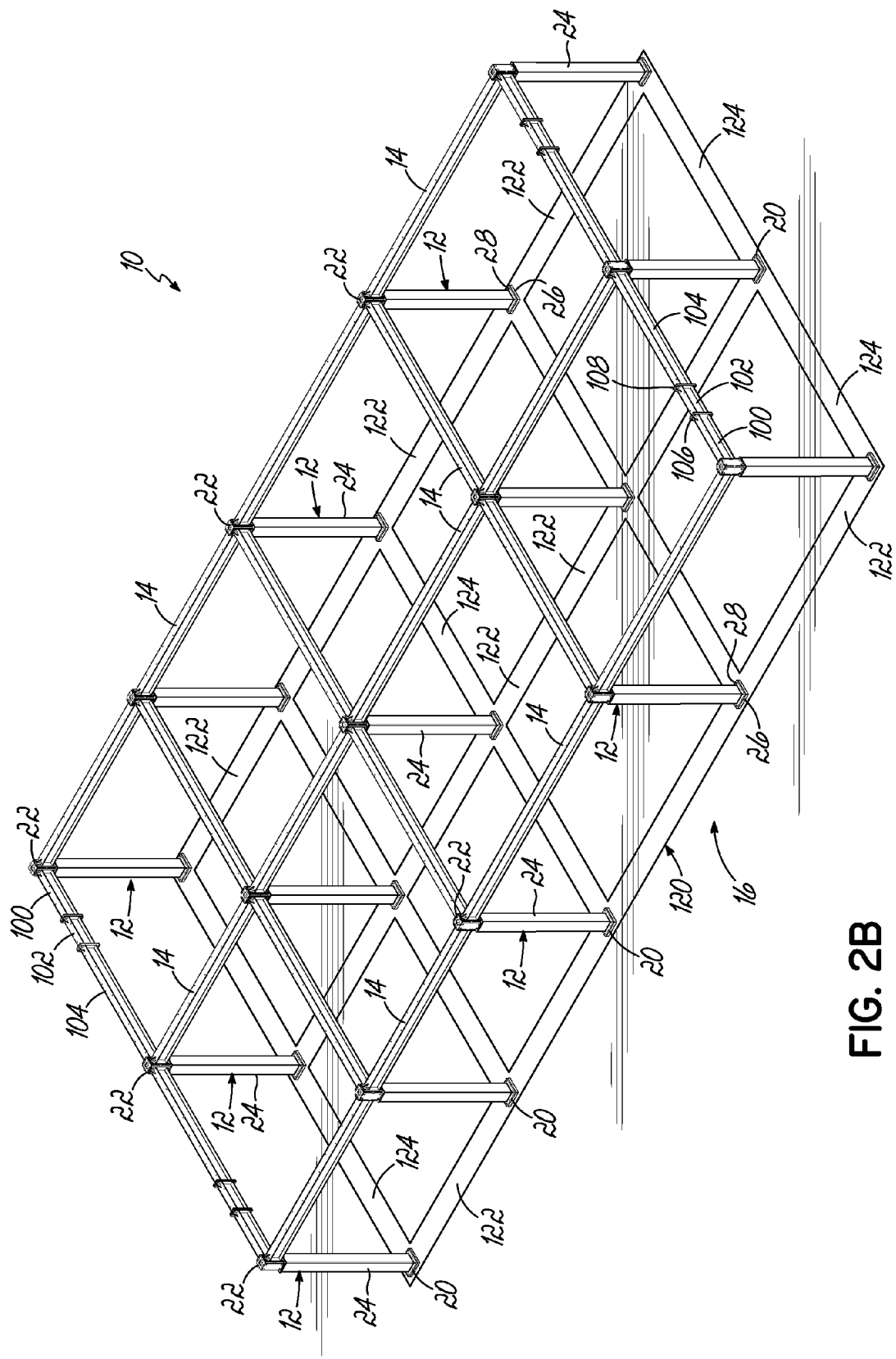
FIG. 2B is an isometric view of columns and beams assembled together into a moment frame that is secured to a concrete foundation member.

Referring to the figures, and beginning with FIGS. 1, 2A, and 2B, a moment frame 10 generally includes a plurality of vertically disposed columns 12 and horizontally disposed beams 14. The moment frame 10 is coupled with a foundation 16. A building structure 18 is supported atop the moment frame 10 and is thereby elevated above the foundation 16 and above grade G. Advantageously, all components of the moment frame 10 can be formed of galvanized metal. The moment frame 10 provides a strong and rigidized support structure for elevating the building structure 18 above grade G, for example at an appropriate elevation above sea level. The building structure 18 may be a single or double family dwelling, for example.

Figure 3:
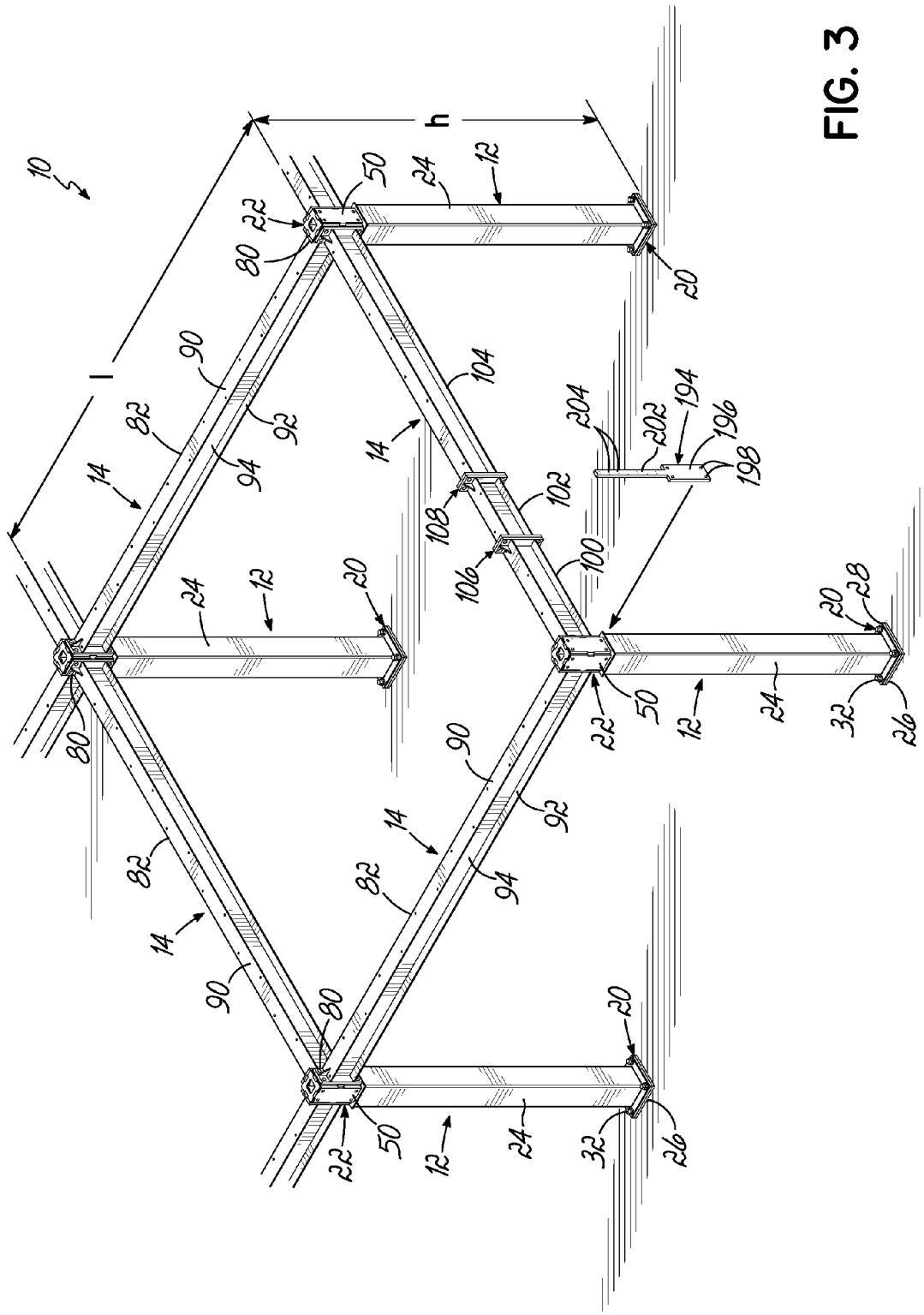
FIG. 3 is an enlarged isometric view of a portion of FIG. 2B, and shows a tie-down plate for securing a building structure with the moment frame.
Figure 4A:
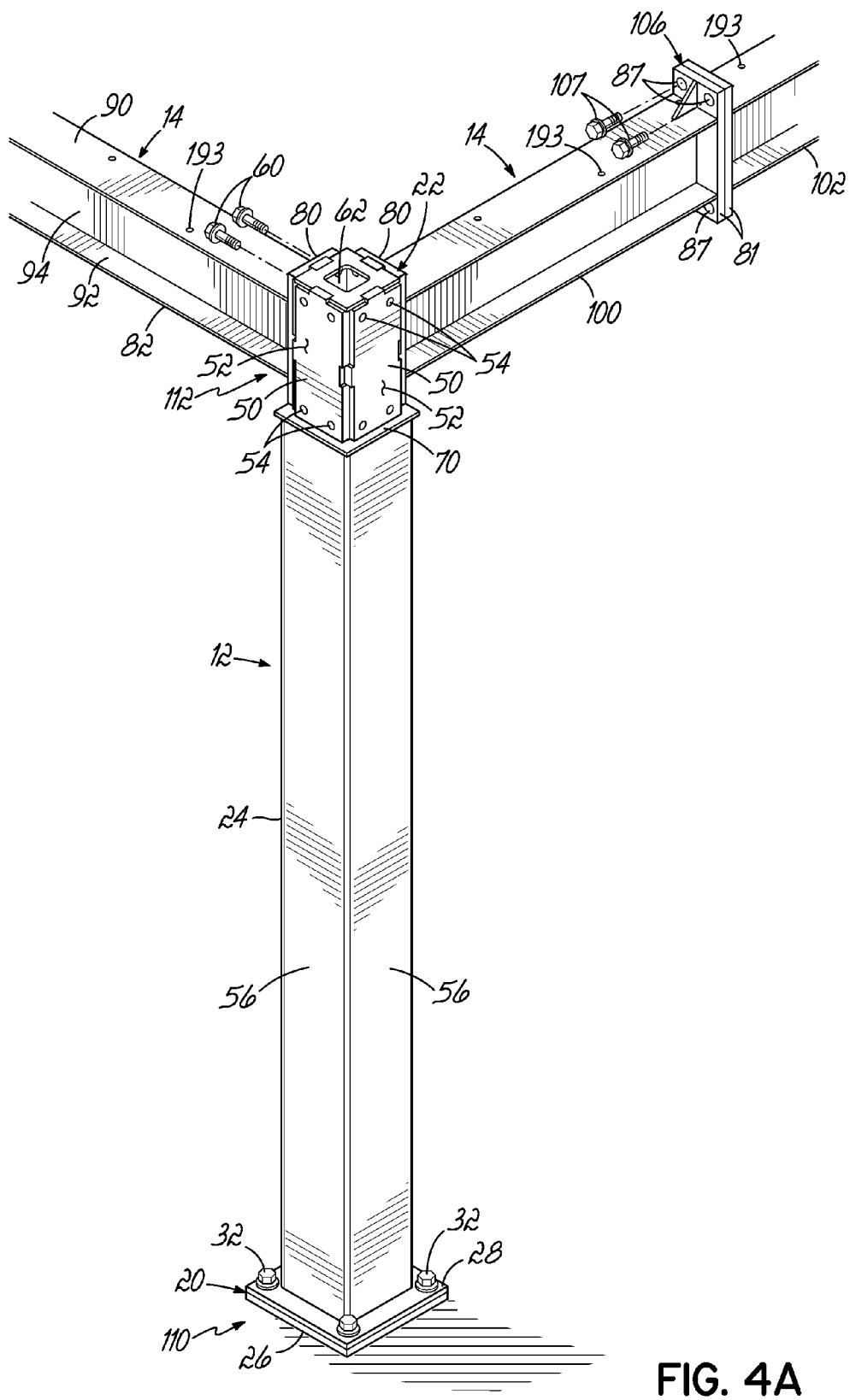
FIG. 4A is an enlarged isometric view of a portion of FIG. 3, and shows bolts used to attach a beam to a column.
Figure 4B:
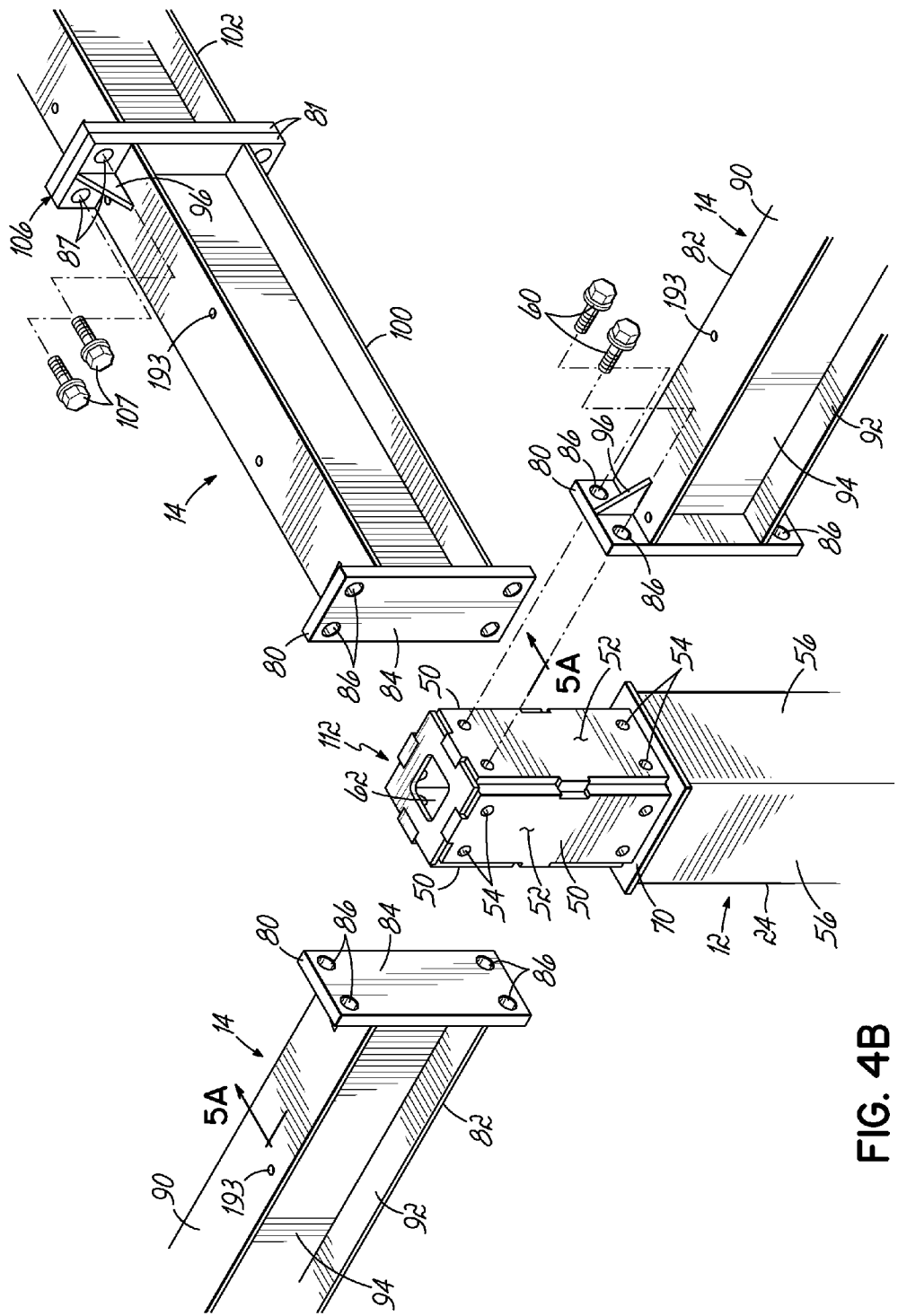
FIG. 4B is an enlarged and disassembled isometric view of another portion of FIG. 3, and shows beams separated from a column and bolts for attaching the beams to the column.

Referring to FIGS. 3, 4A, and 4B, each column 12 of the moment frame 10 is secured to, or coupled with, at least two beams 14, and in some cases three or four beams 14. Each column 12 has a base 20 at one end and an upper fixture 22 at the other end. Each column 12 also has a shaft 24 between the base 20 and the upper fixture 22. In the embodiment shown, the shaft 24 has a generally square profile in cross section transverse to a height h of the column 12. Thereby, the shaft 24 has a doubly symmetric profile. For example, in some embodiments, the shaft 24 can be comprised of square HSS tube steel with dimensions of 8"×8"×¼".

Figure 5A:
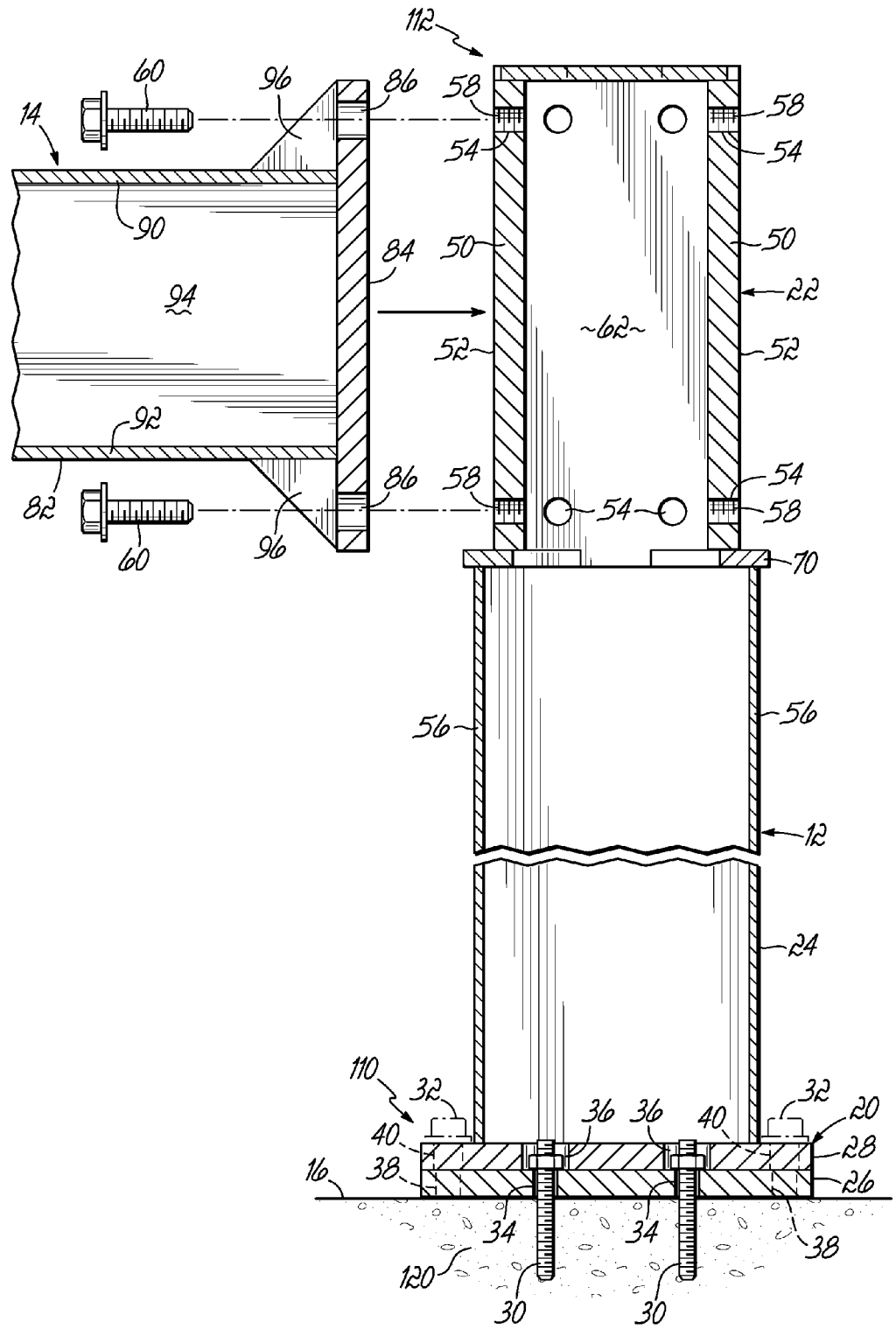
FIG. 5A is a schematic view in partial cross section taken along line 5A-5A of FIG. 4B and shows a column coupled with a concrete foundation member and a beam separated from the column.

Each column 12 is configured to be coupled with the foundation 16 at the base 20. As shown in FIGS. 4A and 5A, the base 20 can optionally have a double base plate construction including a lower base portion 26 configured for coupling with the foundation 16, and an upper base portion 28 coupled with the shaft 24 and configured for coupling with the lower base portion 26. Thereby, a lower base portion 26 can be coupled with the foundation 16, and an associated upper base portion 28 can be coupled with the lower base portion 26 for coupling the column 12 with the foundation 16, as shown in FIG. 2A. For example, bolts 30 are used to secure the lower base portion 26 to the foundation 16 and bolts 32 are used to secure the upper base portion 28 to the lower base portion 26. Optionally, lower base portions 26 may be provided separately from the upper base portions 28, but nonetheless should be considered part of a column 12 if such lower base portions 26 are coupled with the foundation and the upper base portions 28 are coupled with the lower base portions 26.

As shown in FIG. 5A, the bolts 30 for securing the lower base portion 26 with the foundation 16 are positioned through apertures 34 in the lower base portion 26, which are positioned generally near a central region of the lower base portion 26. The upper base portion 28 includes apertures 36 which are generally aligned with the apertures 34 and the bolts 30 contained therein, such that a portion of the bolt 30 that may protrude upwardly beyond the lower base portion 26 can be accommodated in the apertures 36 of the upper base portion 28. In some embodiments, the lower base portion 26 is secured to the foundation 16 using four ⅝" diameter anchor bolts.

The bolts 32 for securing the upper base portion 28 with the lower base portion 26 are positioned through aligned apertures 38, 40, of the lower and upper base portions 26, 28, respectively. The apertures 38, 40 are positioned generally near peripheral regions of the lower and upper base portions 26, 28. In particular, the apertures 40 of the upper base portion 28 are positioned outside of the shaft 24 and generally near the corners of the upper base portion 28. In some embodiments, the apertures 38 of the lower base portion 26 include a threaded region for receiving corresponding threaded portions of the bolts 32. In some embodiments, the upper base portion 28 is secured to the lower base portion 26 using four threaded bolts.

In some embodiments, the base 20 can have length and width dimensions transverse to the height h of the column 12 of 12"×12", and the length and width dimensions of the lower base portion 26 and the upper base portion 28 can be generally similar.

As shown in FIGS. 4A and 4B, the upper fixture 22 of each column 12 has a generally square profile in cross section transverse to the height h of the column 12. The upper fixture 22 defines four attachment faces 50, all of which are generally similar. The attachment faces 50 all extend along the heightwise dimension of the column 12.

Each attachment face 50 includes an outer surface 52 with a plurality of apertures 54 therein. In the embodiment shown, each attachment face 50 resides in a plane that is generally parallel with a plane of a nearby side 56 of the shaft 24 (the shaft 24 defines four sides 56). Also in the embodiment shown, the attachment faces 50 are generally recessed from the sides 56 of the shaft 24.

As shown, each attachment face 50 includes four apertures 54, but a different number of apertures 54 could be used, including a lesser number. Each of the apertures 54 may include a threaded portion 58 configured to receiving a corresponding threaded portion of a bolt 60 when a beam 14 is secured to a column 12, as will be described.

In the embodiment shown, the upper fixture 22 has a generally square tube construction, with each attachment face 50 forming a side of the square tube construction. A void 62 is formed inside the attachment faces 50. In some embodiments, the threaded portion 58 of the apertures 54 may be provided by a nut (not shown) positioned in the void 62 and associated with a respective aperture 54.

Each column 12 also advantageously includes a support ledge 70 that is configured to support a portion of a beam 14. In the embodiment shown, the support ledge 70 is positioned generally between the shaft 24 and the attachment faces 50, and is oriented generally transverse to the height-wise dimension of the column 12. The support ledge 70 extends outwardly beyond both the attachment faces 50 of the upper fixture 22 and the sides 56 of the shaft 24. The support ledge 70 may be made of steel, for example.

With reference to FIGS. 3, 4A, 4B, 5A, and 5B, features of the beams 14 are now described. Each beam 14 extends along a length l, and includes attachment flanges 80 at each end. The attachment flange 80 at one end of the beam 14 is generally similar to the attachment flange 80 at the other end of the beam 14, so a description of one applies to the other. An intermediate portion 82 extends along the length-wise dimension of the beam 14 between the attachment flanges 80. The attachment flanges 80 are connected with the intermediate portion 82.

Each attachment flange 80 includes an outer surface 84 that faces generally away from the intermediate portion 82 and a plurality of apertures 86 extending in the lengthwise dimension through the attachment flange 80. In the embodiment shown, each attachment flange 80 includes four apertures 86, but a different number of apertures 86 could be used, including a lesser number. Also in the embodiment shown, two of the apertures 86 are generally above the intermediate portion 82 and two of the apertures 86 are generally below the intermediate portion 82. The attachment flange 80 is oriented generally perpendicular to the length-wise dimension of the beam 14.

The intermediate portion 82 includes an upper member 90 and a lower member 92. The upper and lower members 90, 92 extend generally parallel with one another and with a plane of the lengthwise dimension of the beam 14. In the embodiment shown, the intermediate portion 82 has a profile transverse to the length-wise dimension having a generally I-shape, with a web 94 extending between the upper and lower members 90, 92. In some embodiments, the beams 14 can include W8×18 structural steel.

Optionally, gussets 96 may be included and further connect the attachment flanges 80 with the intermediate portion 82. In particular, generally triangular-shaped gussets 96 extend between each attachment flange 80 and the upper member 90, and between each attachment flange 80 and the lower member 92.

The columns 12 and beams 14 are secured together using the respective apertures 54, 86. In particular, the apertures 54 of each attachment face 50 of each column 12 and the apertures 86 of each attachment flange 80 of each beam 14 are arranged in corresponding patterns so as to generally align with each other when an attachment flange 80 is brought into confronting relationship with an attachment face 50. That way, either attachment flange 80 of any of the beams 14 and any one of the attachment faces 50 of any of the columns 12 can be placed into confronting relationship with one another, and at least some of the respective apertures 54,86 will be aligned for securing the respective column 12 and beam 14 together.

In particular, the outer surface 84 of an attachment flange 80 is brought into confronting relationship with the outer surface 52 of an attachment face 50. A plurality of the apertures 86 of the attachment flange 80 are aligned with a plurality of the apertures 54 of the attachment face 50. Advantageously, all the apertures 86 are aligned with all the apertures 54.

Figure 5B:
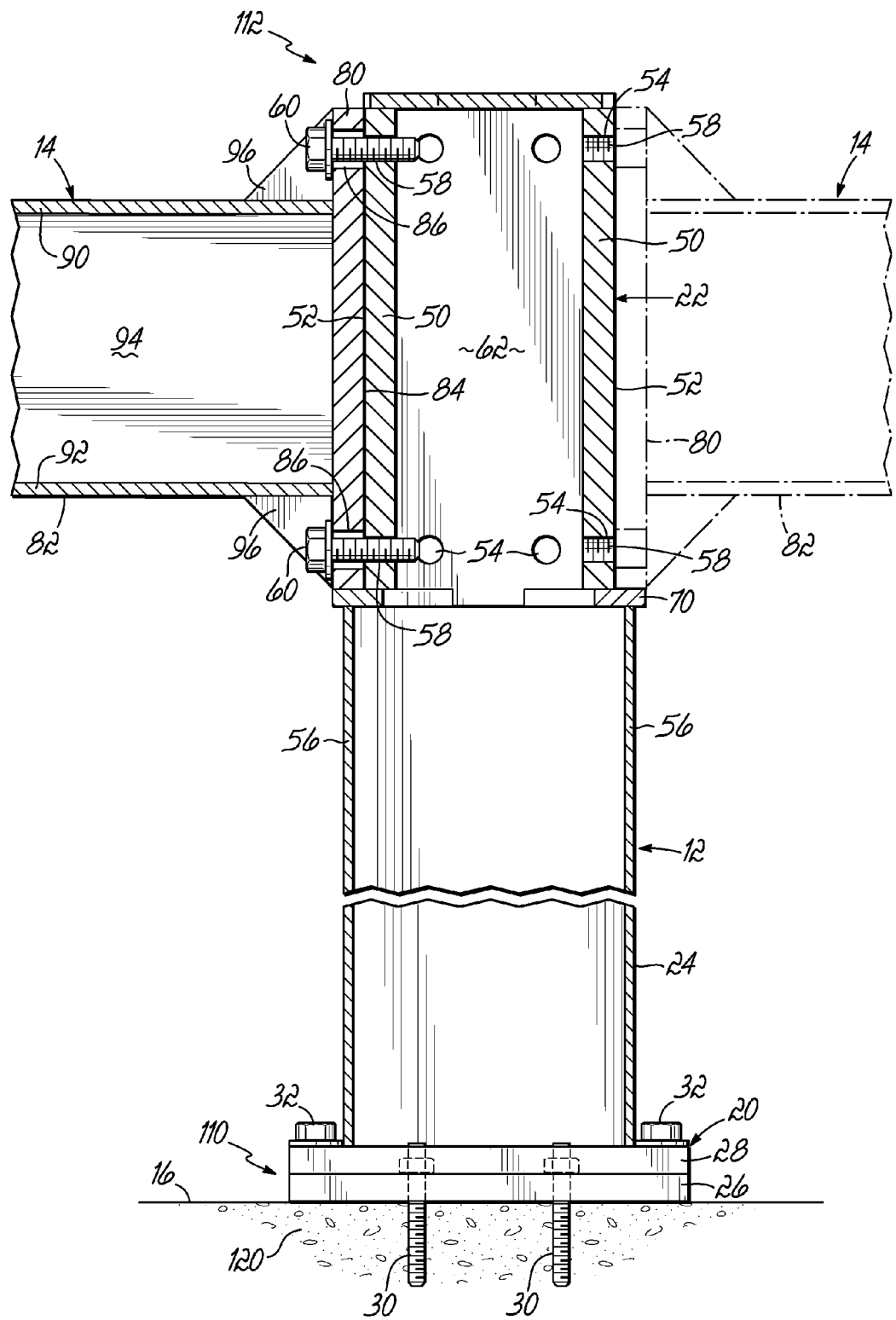
FIG. 5B is a schematic view like FIG. 5A, with a beam attached to the column and another beam shown in phantom.

Bolts 60 are placed through the apertures 86, 54 to secure the attachment flange 80 with the attachment face 50, as shown in FIGS. 4B and 5A. The bolts 60 are also threaded into the threaded portion 58 of the apertures 54 of the attachment face 50, as shown in FIG. 5B.

According to some embodiments, each attachment flange 80 is secured to each attachment face 50 with four bolts 60. Optionally, a lesser number of bolts 60 could be used per secured-together attachment flange 80 and attachment face 50. In some embodiments, the bolts 60 are ⅞" diameter bolts.

Advantageously, the shape of the attachment flange 80 and the attachment face 50 are configured to reduce or resist the moment forces between a column 12 and a beam 14. Particularly, the attachment face 50 and the outer surface 84 interact over a sufficiently large area so as to reduce or eliminate regions in the interface of a column 12 and a beam 14 that would experience severe moment forces. Thereby, the moment frame 10 provides a sturdy and durable framework for supporting a building structure that is unlikely to be toppled by an environmental event, such as a severe storm or wave action.

By providing a support ledge 70 on a column 12, the attachment flange 80 of a beam 14 can be put in a position to rest on, or be supported by, the support ledge 70 when the attachment flange 80 is brought into confronting relationship with the attachment face 50. As shown in FIG. 5B, the support ledge 70 also supports the attachment flange 80 when the attachment flange 80 is secured to the attachment face 50. Thereby, the support ledge 70 reduces the shear stress at the interface of the column 12 and the beam 14. In this way, the bolts 60 used to make the connection between a column 12 and a beam 14 primarily resist moment forces, whereas shear stress is transferred through the support ledge 70. The support ledges 70 also aid in construction of the moment frame 10, because the beams 14 can be placed on the ledges 70, thereby eliminating the need for temporary vertical supports, cranes, or shoring to support the beams 14 while they are secured to the columns 12.

One or more of the beams 14 may be comprised of subparts that are joined together at a splice. For example, FIGS. 2B and 3 show that a beam 14 can include a first subpart 100, a second subpart 102, and a third subpart 104. The three subparts 100, 102, 104 are secured together, and the subparts 100, 104 are secured to columns 12. In particular, the subparts 100, 104 have attachment flanges 80 that are secured to attachment faces 50 of the columns 12, as discussed above. The subparts 100, 104 also include attachment structure for securing with the subpart 102 to form respective splices 106, 108. For example, each of the subparts 100, 102, 104 can include attachment flanges 81 at one or both respective ends thereof, and the flanges 81 of adjacent subparts may be put into confronting relationship and secured together to form the splices 106, 108. For example, bolts 107 can be put through respective apertures 87 of the confronting attachment flanges 81 to secure them together. Advantageously, the flanges 81 may be similar to the flanges 80 discussed above.

The ability to provide spliced together beams 14 allows the moment frame 10 to be constructed around other support devices (such as wooden logs) that are used to support an existing building structure in a raised position. Once the moment frame 10 is substantially constructed such that the moment frame 10 can support the building structure, the other support devices can be removed. When the other support devices are removed, beam subparts can be spliced together to complete the moment frame 10 in regions where the other support devices were previously located.

Thereby, columns 12 and beams 14 can be assembled into the moment frame 10 shown in FIGS. 1 and 2B. In the assembled moment frame 10, each column 12 is coupled with at least two beams 14. Some columns 12 are coupled with three beams 14, and some columns 12 are coupled with four beams 14. Advantageously, the configuration of the columns 12 and beams 14 allows a beam 14 to be coupled with any side of a column 12.

Each column 12 extends between a lower end 110 and an upper end 112. As shown, the lower end 110 is defined by the base 20 and the upper end 112 is defined by the upper fixture 22. As shown in FIGS. 1 and 4A, when the columns 12 and beams 14 are assembled into the moment frame 10, the intermediate portion 82 of each beam 14 is positioned generally below the upper end 112 of each column 12. In some embodiments, the upper member 90 of the intermediate portion 82 is approximately three inches below the upper end 112. In some embodiments, the distance between the lower end 110 and the upper end 112 is sufficient to accommodate an automobile, such as for example, 7.5 to 8.5 feet.

The relationship between the moment frame 10 and the foundation 16 is now described. As shown in FIGS. 1, 2A, 2B, 5A, and 5B, the foundation 16 includes a concrete foundation member 120 that is at grade G, or slightly below grade G. As shown in FIGS. 2A and 2B, the concrete foundation member 120 is configured in a grid-like manner and includes a plurality of sections 122 extending along one direction of the moment frame 10, and a plurality of sections 124 extending along another direction of the moment frame 10.

The lower base portions 26 of the columns 12 are coupled with the foundation 16, such as by securing the lower base portions 26 to the concrete foundation member 120, as shown in FIGS. 1 and 5A. The upper base portions 28 may be secured to the lower base portions 26 to secure the columns 12 to the concrete foundation member 120. The beams 14 may be secured to the columns 12 to assemble the moment frame 10, as discussed above. Thereby, the moment frame 10 is secured to the foundation 16.

Optionally, the concrete foundation member 120 may also include reinforcements, such as reinforcing bars. And while the concrete foundation member 120 is shown as an interconnected collection of sections 122, 124, it will be appreciated that the foundation 16 could alternatively include a collection of unconnected concrete foundation members, or a large unitary concrete foundation member.

The foundation 16 may also include a plurality of pilings 126 that extend downwardly into the ground. The pilings 126 are all below grade G, and in particular extend downwardly from, and are coupled with, the concrete foundation member 120. The pilings 126 can optionally include helical flighting 128, as shown, and such pilings 126 may be referred to as helical piles. The pilings 126 can be installed at any appropriate angle. For example, and as shown in FIG. 1, some of the pilings 126 are installed at batter angles other than vertical. The use of batter angles increases the lateral resistance of the overall foundation 16 so that it is more stable from wind and flood forces. Also as shown, the concrete foundation member 120 is formed such that a pile cap 130, which may optionally be part of each piling 126, is embedded in the concrete foundation member 120. Thereby, the concrete foundation member 120 is supported by the pilings 126.

While the foundation 16 shown in FIGS. 1, 2A, 2B, 5A, and 5B includes both a concrete foundation member 120 and pilings 126, it will be appreciated that the moment frame 10, including its columns 12 and beams 14, could be used with other types of foundations, as well.

Figure 6:
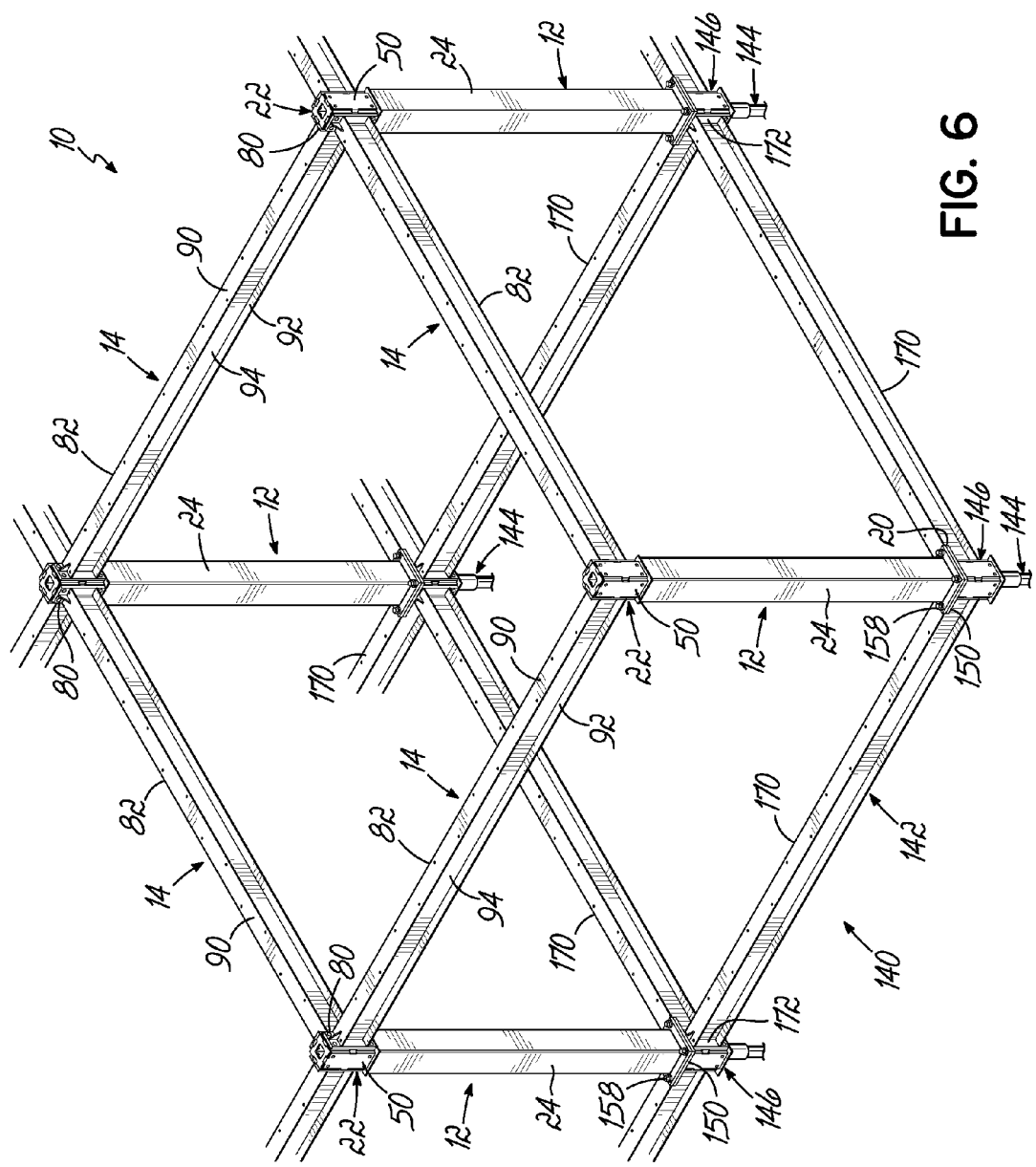
FIG. 6 is an isometric view of a moment frame secured to an alternative foundation in accordance with further the principles of the present invention.
Figure 6A:
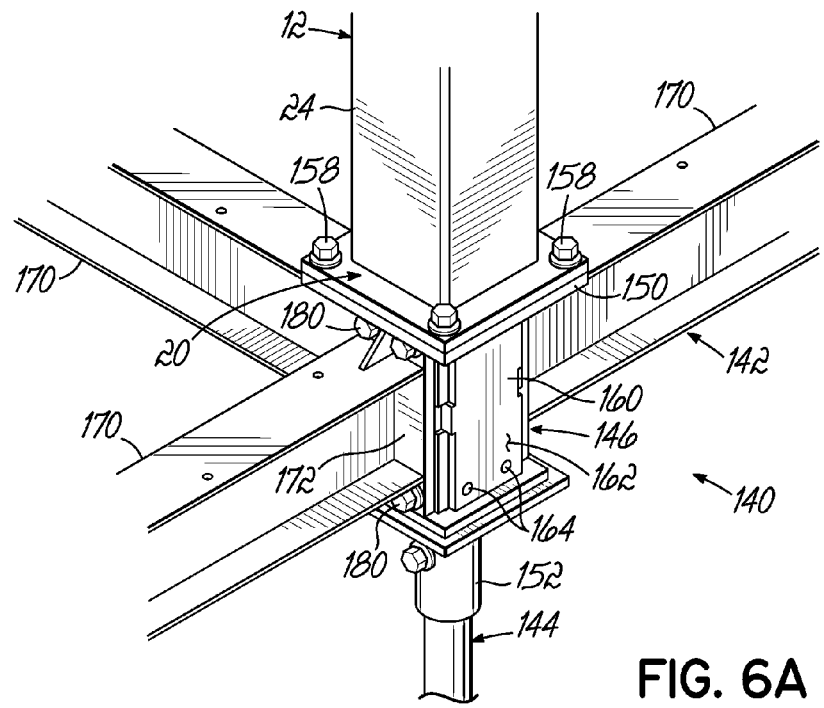
FIG. 6A is an enlarged isometric view of a portion of FIG. 6, and shows a column of the moment frame secured to an attachment member of the foundation, and also shows the attachment member secured to beams of the foundation and also to a piling.
Figure 7:
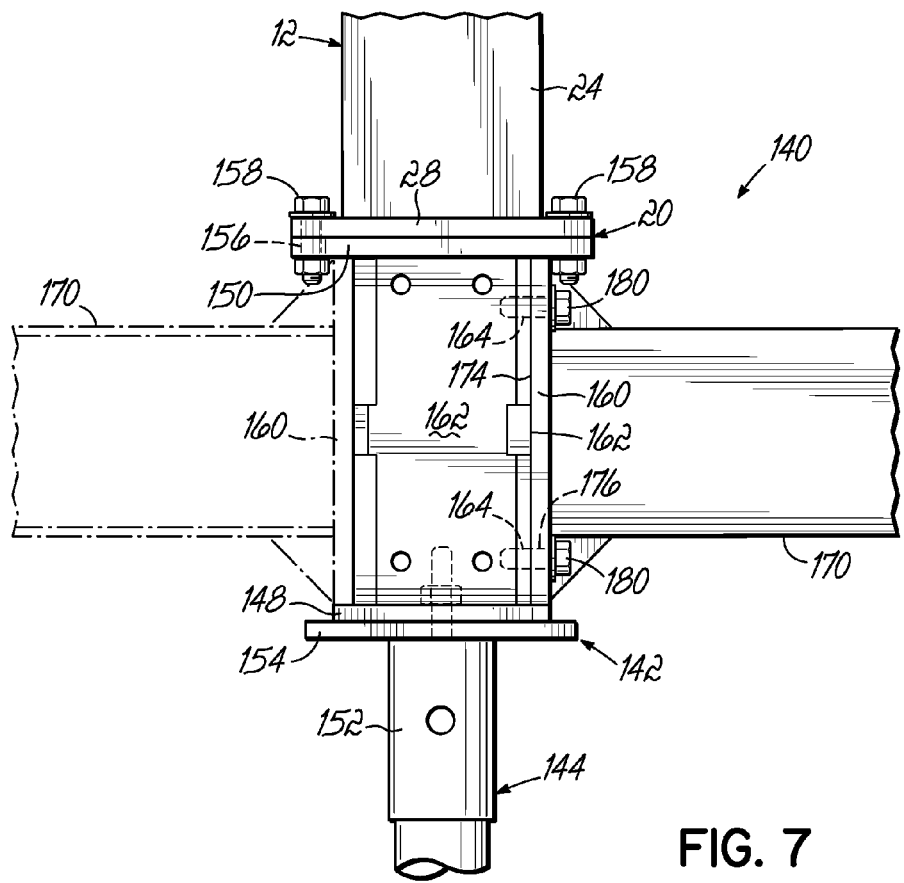
FIG. 7 is a side view a column of the moment frame secured to an attachment member of the foundation, and also shows the attachment member secured to beams of the foundation and also to a piling.

For example, and as shown in FIGS. 6, 6A, and 7, a foundation 140 is shown for use with the moment frame 10, and does not use concrete foundation members. The foundation 140 includes a foundation framework 142 and a plurality of pilings 144 that extend downwardly into the ground. The foundation framework 142 is coupled with the pilings 144. The pilings 144 may be generally similar to the pilings 126 discussed above, and may having helical flighting so as to be referred to as helical piles. The foundation framework 142 is at grade G, or slightly below grade G, and includes a plurality of attachment members 146, each of which is coupled with a piling 144 of the foundation 140.

In particular, each attachment member 146 is a generally box-like structure that includes a lower plate 148 and an upper plate 150. The lower plate 148 is configured for coupling with a piling 144. Particularly, each piling 144 includes a pile cap 152 having a pile cap plate 154. The lower plate 148 of each attachment member 146 is configured to be put into confronting relationship with, and secured to, the pile cap plate 154 of a pile cap 152.

The upper plate 150 is configured to support, and be coupled with, a column 12 of the moment frame 10. In particular, the upper plate 150 is sized so that the base 20 of a column 12 can be set upon, and secured to, the upper plate 150. The upper plate 150 can include bores 156 that are configured to align with any of the apertures 34, 36, 38, 40 of either or both of the lower base portion 26 and the upper base portion 28 of the base 20. For example, and as shown, the bores 156 are configured to align with the apertures 38, 40 such that bolts 158 can be used to secure the lower base portion 26 and the upper base portion 28 of the column 12 to the upper plate 150 of the attachment member 146.

Each attachment member 146 has a generally square profile in cross section transverse to a height thereof and provides four attachment faces 160 generally between the lower plate 148 and the upper plate 150. The attachment faces 160 are generally similar to one another, and may also be generally similar to the attachment faces 50 of the upper fixture 22 described above. Particularly, each attachment face 160 includes an outer surface 162 with a plurality of apertures 164 therein. Each attachment face 160 also includes four apertures 166, but a different number of apertures 166 could be used, including a lesser number. Each of the apertures 166 may include a threaded portion 168 configured to receive a corresponding threaded portion of a bolt.

The foundation framework 142 also includes a plurality of beams 170 extending between the attachment members 146. The beams 170 may be similar to the beams 14 discussed above, for example. Each beam 170 extends along a length and includes attachment flanges 172 at each end. Each attachment flange 172 includes an outer surface 174 and a plurality of apertures 176 extending through the attachment flange 172. In the embodiment shown, each attachment flange 172 includes four apertures 176, but a different number of apertures 176 could be used, including a lesser number.

The beams 170 and attachment members 146 are secured together using the respective apertures 164, 176. In particular, the apertures 164 of each attachment face 160 and the apertures 176 of each attachment flange 172 are arranged in corresponding patterns so as to generally align with each other when an attachment flange 172 is brought into confronting relationship with an attachment face 160. That way, either attachment flange 172 of any of the beams 170 and any of the attachment faces 160 of any of the attachment members 146 can be placed into confronting relationship with one another, and the respective apertures 164, 176 will be aligned for coupling the respective beam 170 with the respective attachment member 146.

In particular, the outer surface 174 of an attachment flange 172 is brought into confronting relationship with the outer surface 162 of an attachment face 160. A plurality of the apertures 176 of the attachment flange 172 are aligned with a plurality of the apertures 164 of the attachment face 160. Advantageously, all the apertures 176 are aligned with all the apertures 164.

Bolts 180 are placed through the apertures 176, 164 to secure the attachment flange 172 with the attachment face 160. The bolts 180 are threaded into the threaded portion 168 of the apertures 164 of the attachment face 160. According to some embodiments, each attachment flange 172 is secured to each attachment face 160 with four bolts 180. Optionally, a lesser number of bolts 180 could be used per secured-together attachment flange 172 and attachment face 160.

As shown in FIG. 7, each attachment member 146 can include a support ledge 182 that an attachment flange 172 of a beam 170 can rest on, or be supported by. As shown, the support ledge 182 is provided by the lower plate 148 and supports the attachment flange 172 when the attachment flange 172 is brought into confronting relationship with and secured to the attachment face 160. The support ledge 182 may be made of steel, for example. Thereby, the support ledge 182 reduces the shear stress at the interface of the attachment member 146 and the beam 170.

Thereby, the attachment members 146 and the beams 170 can be assembled into the foundation framework 142 shown in FIG. 6. In the assembled foundation framework 142, each attachment member 146 is connected with at least two beams 170, some attachment members 146 are connected with three beams 170, and some attachment members 146 are connected with four beams 170. Advantageously, the configuration of the attachment members 146 and the beams 170 allows a beam 170 to be connected with any side of an attachment member 146. Further advantageously, where the beams 14 and 170 are similar, the same beam 14 or 70 can be used for the moment frame 10 as for the foundation framework 142.

Once the foundation framework 142 has been assembled, the columns 12 can be secured to the attachment members 146. In particular, the base 20 of each column 12 is secured to the upper plate 150 of an attachment member 146. The beams 14 may be secured to the columns 12 to assemble the moment frame 10, as discussed above. Thereby, the moment frame 10 is secured to the foundation 140.

The relationship between the moment frame 10 and the building structure 18 is now described. As shown in FIG. 1, the building structure 18 is supported atop the moment frame 10 so as to be elevated above the foundation 16. In particular, a rim joist 190 (or blocking) associated with the building structure 18 is set atop the columns 12 and beams 14 of the moment frame 10. Advantageously, one or more sill plates 192 are positioned atop the intermediate portions 82 of the beams 14 and extend upwardly to the upper ends 112 of the columns 12. The building structure 18 can thereby be positioned on the sill plates 192. The intermediate portions 82 may include apertures 193 in the upper members 90 thereof to facilitate securing the sill plates 192 to the intermediate portions, such as by screws, bolts, or the like. For example, such apertures 193 in the upper members 90 can be arranged in two staggered rows, with 9/16" diameter apertures at 24" on center.

Optionally, a plurality of tie-down plates 194 may be provided for securing the building structure 18 to the moment frame 10. Particularly, each tie-down plate 194 is configured to be secured to a column 12, and in particular to an attachment face 50 of an upper fixture 22 of a column 12. In the embodiment shown, each tie-down plate 194 includes a first portion 196 having a plurality of apertures 198. The first portion 196 is configured to be secured to an attachment face 50, and the apertures 198 are provided so as to correspond with the apertures 54 of an attachment face 50. The tie-down plate 194 is brought into a confronting relationship with an attachment face 50, and a plurality of the apertures 198 are aligned with a plurality of the apertures 54. Bolts 200 are placed through the apertures 198, 54 to secure the tie-down plate 194 to the attachment face 50. For example, the bolts may be threaded into the threaded portion 58 of the apertures 54 of the attachment face 50.

Each tie-down plate 194 also includes a second portion 202 configured to be secured to the building structure 18. For example, the second portion 202 can include a plurality of apertures 204 to receive fasteners, such as nails or screws, to secure the second portion 202 to framing 206 of the building structure.

Figure 8:
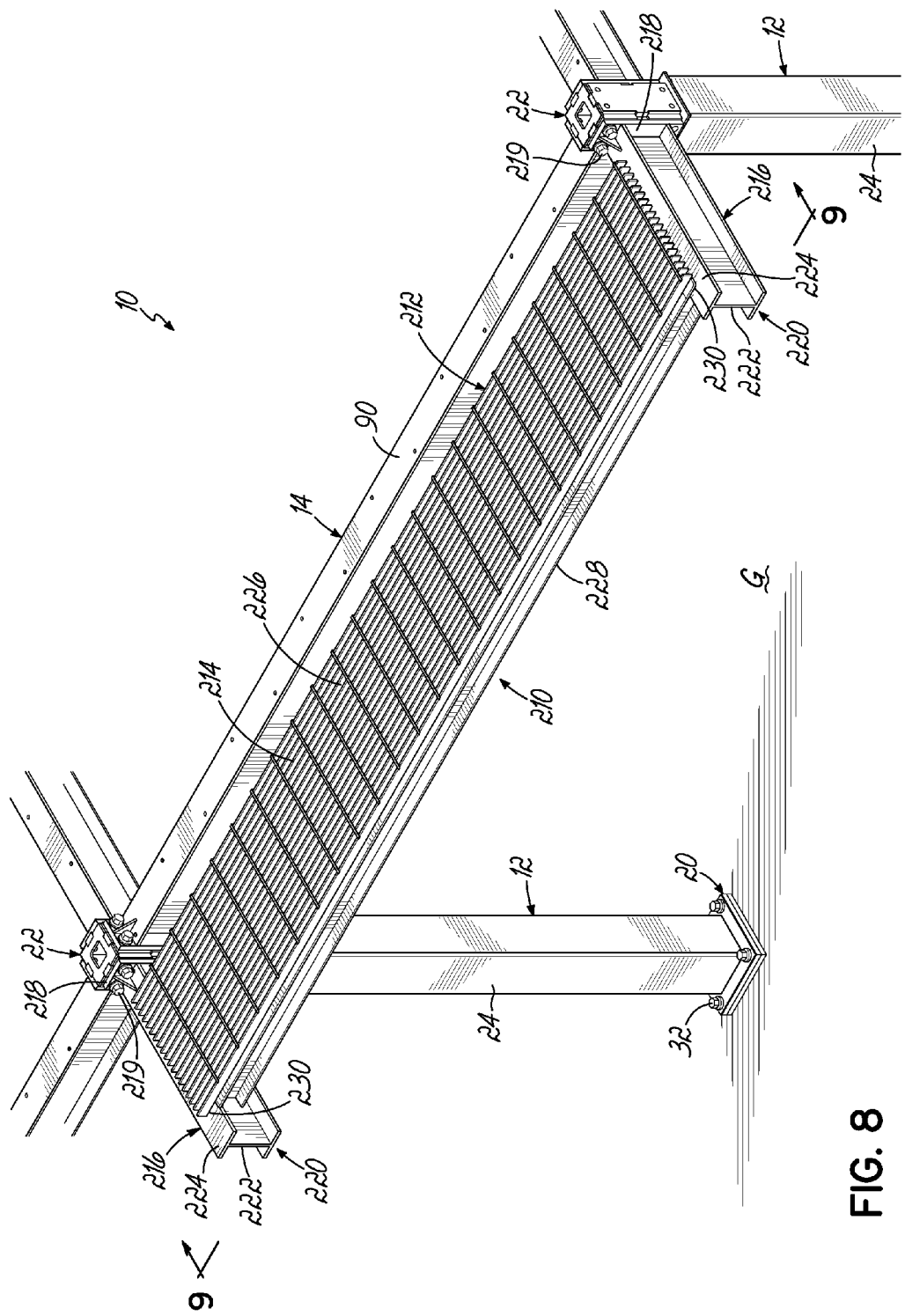
FIG. 8 is an isometric view showing an elevated platform assembly secured to the moment frame.
Figure 9:
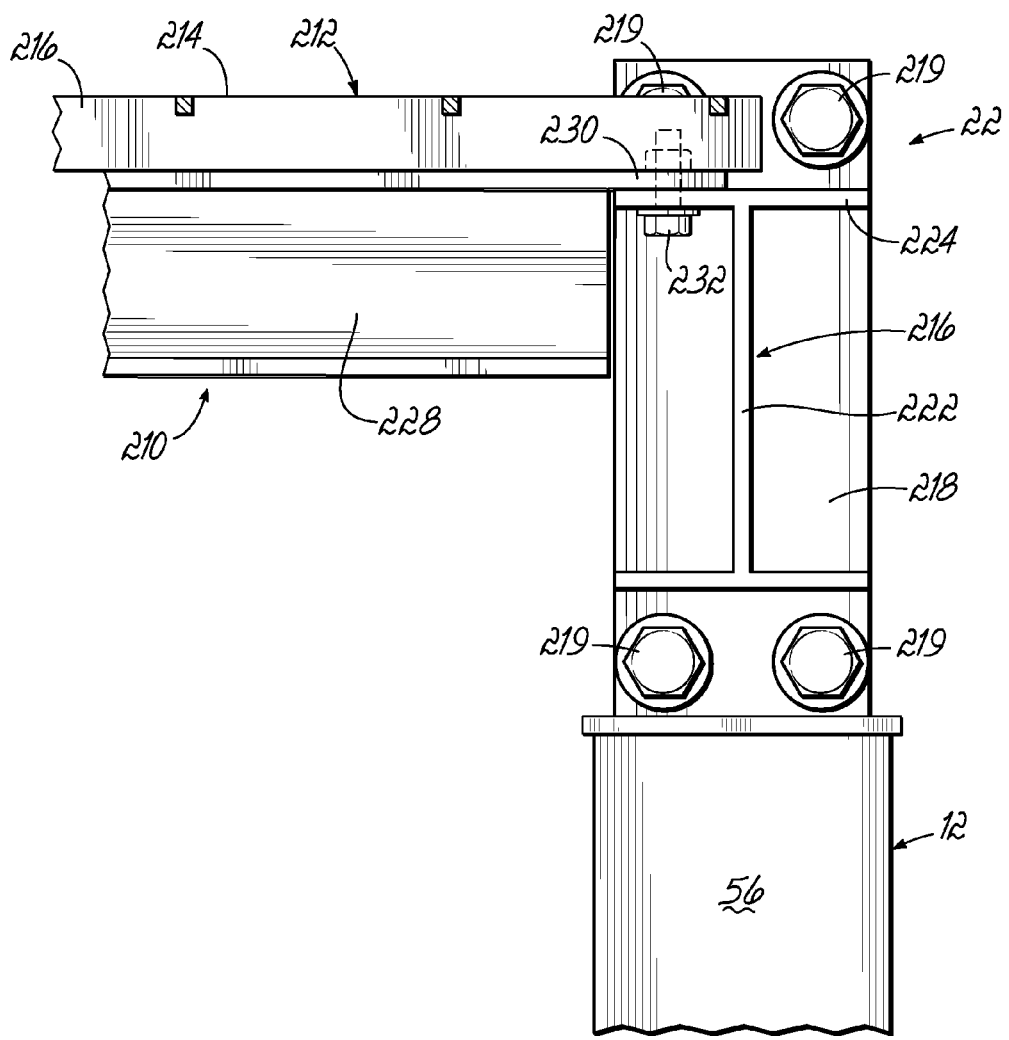
FIG. 9 is a view taken along line 9-9 of FIG. 8.

As shown in FIGS. 8 and 9, an elevated platform assembly 210 is secured to the moment frame 10. The elevated platform assembly 210 includes a platform element 212 that provides a platform surface 214. The platform surface 214 can support objects or people, for example, at an elevated position relative to grade G and above the foundation 16 or 140, thereby keeping those objects or people elevated above flood levels and protected from wave action. For example, the platform surface 214 can support air conditioning, heating, or ventilation units, or pumps or filtration systems for a swimming pool. Additionally, the platform element 212 can provide or support a deck upon which people can stand, sit, or place various objects. The elevated platform assembly 210 may be temporarily or permanently attached to the moment frame 10, and is generally positioned along the outer extent of the moment frame 10. For example, the elevated platform assembly 210 would be positioned generally adjacent to, but outside of, a building structure supported atop the moment frame.

The platform element 212 is supported by cantilevered beams 216 that extend from the columns 12 of the moment frame 10. Each cantilevered beam 216 includes an attachment flange 218 at an end thereof. The attachment flange 218 is configured to be secured with an upper fixture 22 of a column 12. For example, the attachment flange 218 may be similar to the attachment flanges 80 of the beams 14 discussed above, and may be attached to the upper fixture 22 in a generally similar manner using bolts 219. The cantilevered beam 216 has a free end 220 located generally opposite the attachment flange 218. The free end 220 is not secured to any component of the moment frame 10. An intermediate portion 222 of the cantilevered beam 216 is located between the attachment flange 218 and the free end 220, and includes an upper member 224.

The platform element 212 generally spans between the cantilevered beams 216. As shown, the platform element 212 is positioned generally near a beam 14 of the moment frame 10. The platform element 212 partially sits atop the upper members 224 of the cantilevered beams 216. The intermediate portion 222 may have a generally similar construction as the intermediate portions 82 of the beams 14 discussed above.

As shown, the cantilevered beams 216 extend a length outwardly from the column 12 approximately equal to a width of the platform element 212. Suitable lengths for the cantilevered beams 216 will be evident to persons skilled in the art.

In the embodiment shown, the platform element 212 includes grating 226 and one or more lengthwise-extending span members 228, which are secured to the grating 226. The span members 228 are generally configured so as to fit between the respective cantilevered beams 216, while the grating 226 is generally configured to sit on the upper members 224 of the cantilevered beams 216.

The platform element 212 may be secured to the cantilevered beams 216 in any appropriate manner. For example, and as shown in FIG. 9, a ledge 230 extending from the span members 228 rests on the cantilevered beam 216, and is secured thereto by a bolt 232 that extends through the upper member 224.

While the platform element 212 shown includes grating 226 and span members 228, it will be appreciated that other platform elements could also be used, such as, for example, those including wood stringers or joists that are covered by decking material. And while the elevated platform assembly 210 shown includes two cantilevered beams 216, it will also be appreciated that elevated platform assemblies could also include a greater number of cantilevered beams 216, and also a greater number of platform elements 212.

Components of the moment frame 10 can be provided as a kit unassembled for easy transport to a site location. The moment frame 10 can be used to support an already existing building structure, or a new building structure can be built atop the moment frame.

The moment frame 10 can thereby be used as part of elevating a building structure above a foundation as follows. The base 20 of each column 12 is coupled with the foundation, such as 16 or 140. The beams 14 are secured with the columns 12, as discussed above. This may include securing a lower base portion 26 of a column 12 to the foundation, and securing an upper base portion 28 to the lower base portion 26. The building structure 18 can be placed atop the moment frame 10. This placing can include either positioning an existing building structure atop the moment frame 10 or building the building structure 18 atop the moment frame 10. In some embodiments, it may be necessary to prepare the foundation before coupling the columns 12 thereto. The foundation can be prepared as discussed above. This may include forming a concrete foundation member 120, and forming a concrete foundation member 120 with a pile cap 130 embedded therein. Preparing the foundation may also include forming a foundation framework 142. Preparing the foundation may also include installing pilings 126 or 144 into the ground, and securing the pilings 126 or 144 to either a concrete foundation member 120 or a foundation framework 142. The pilings 126 or 144 may include helical flighting. The elevated platform assembly 210 can also be secured to the moment frame 10. In particular, the cantilevered beams 216 are secured to the columns 12, and the platform element 212 is supported by the cantilevered beams 216.

By virtue of the foregoing, there is thus provided a moment frame support structure system with which to support building structures above grade, such as to satisfy current flood level requirements, while also reducing or eliminating the drawbacks of other support structures which have been used.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. For example, while the base 20 of each column 12 is described as including a lower base portion 26 and an upper base portion 28, a single base portion could also be used. The invention in its broader aspects is therefore not limited to the specific details, representative apparatus and methods and illustrative examples shown and described. Accordingly, departures may be made from such details without departing from the scope or spirit of the general inventive concept.

Having described the invention, what is claimed is:

1. A system for elevating a building structure above grade, comprising:
   at least four beams each having a transverse attachment flange at each of the respective ends thereof;
   at least four columns each having a base at one end configured to couple with a foundation and a generally square upper fixture at another end thereof defining four attachment faces, each column further including a single support ledge projecting outwardly from each of the four attachment faces, the support ledge configured to directly contact and support a respective attachment flange at each of the four attachment faces, and each column further including a shaft extending between the base and the upper fixture, wherein the support ledge is positioned between the shaft and the attachment faces, and wherein each of the attachment faces of the upper fixture of each column defines an outer surface that is disconnected from the outer surface of an adjacent attachment face such that the attachment faces collectively define a discontinuous outer surface of the upper fixture;
   the attachments flanges and attachment faces having corresponding patterns of bolt-receiving apertures such that either attachment flange of any one of the beams and any one of the attachment faces of any one of the columns can be placed into confronting relationship such that a plurality of the apertures of each of the confronting attachment flange and the confronting attachment face are aligned so that the confronting attachment flange and the confronting attachment face are positioned to be secured together by one or more bolts received in one or more of the aligned apertures,
   whereby the beams and the columns are assembleable with the beams being horizontally disposed, the columns being vertically disposed, the bases being coupled with said foundation, and at least two attachment faces of each of the upper fixtures of the columns being secured to respective attachment flanges of at least two of the beams to provide a moment frame adapted to support a building structure mounted thereatop elevated from said foundation and above grade.

2. The system of claim 1, the base of each column including a lower base portion configured for coupling with said foundation and an upper base portion coupled with the shaft and configured for coupling with the lower base portion.

3. The system of claim 1, each aperture of each attachment face of each column including a threaded portion configured for receiving a corresponding threaded portion of a bolt.

4. The system of claim 1, each attachment face of each column including four or fewer apertures.

5. The system of claim 1, each attachment flange of each beam including four or fewer apertures.

6. The system of claim 1, each column including an upper end and each beam including an intermediate portion between the attachment flanges, wherein when the beams and columns are assembled into the moment frame, the intermediate portion of each beam is positioned below the upper ends of the columns.

7. The system of claim 1, each beam including an intermediate portion between the attachment flanges, each intermediate portion including an I-shaped profile defined by an upper beam member, a lower beam member, and a web extending between the upper beam member and the lower beam member.

8. The system of claim 1, wherein the shaft of each column includes a square profile.

9. The system of claim 1, each beam including an intermediate portion between the attachment flanges and gussets connecting the attachment flanges with the intermediate portion.

10. The system of claim 1, each column and each beam being formed of galvanized metal.

11. The system of claim 1, further comprising:
a plurality of tie-down plates configured for securing to said building structure and to the columns, the tie-down plates and attachment faces of each column having corresponding patterns of bolt-receiving apertures such that a tie-down plate and any one of the attachment faces of any one of the columns can be placed into confronting relationship and secured together by bolts received in the respective apertures of the confronting tie-down plate and attachment face.

12. The system of claim 1, wherein at least one of the beams is formed of a first subpart and a second subpart joined together at a splice.

13. The system of claim 1, further comprising:
an elevated platform assembly, wherein when the beams and columns are assembled into the moment frame, and the elevated platform assembly provides a platform surface elevated from the foundation.

14. The system of claim 13, the elevated platform assembly including at least two cantilevered beams secured to the moment frame and a platform element supported by the cantilevered beams and providing the platform surface.

15. The system of claim 14, each cantilevered beam including an upper member, and the platform element including grating sitting on the upper members.

16. The system of claim 1, wherein the foundation includes a foundation framework and a plurality of pilings, the foundation framework comprising:
at least four attachment members, each attachment member positioned at or below grade and beneath the base of a respective one of the columns,
wherein each attachment member is configured to be secured to the base of the respective one of the columns, and also configured to be secured to a respective one of the pilings.

17. The system of claim 16, wherein each attachment member provides four attachment faces separate from the attachment faces of the respective upper fixture, the system further comprising:
at least four additional beams, the additional beams each having a transverse attachment flange at each of the respective ends thereof,
wherein the attachment faces of the attachment members and the attachment flanges of the additional beams each have corresponding patterns of bolt-receiving apertures such that either attachment flange of any one of the additional beams and any one of the attachment faces of any one of the attachment members can be placed into confronting relationship such that a plurality of the apertures of each of the confronting attachment flange of the additional beam and the confronting attachment face of the attachment member are aligned such that the confronting attachment flange of the additional beam and the confronting attachment face of the attachment member are configured to be secured together by bolts received in one or more of the aligned apertures.

18. The system of claim 1, whereby the columns are sized to accommodate an automobile between the foundation and the beams when the beams and columns are assembled into the moment frame.

19. The system of claim 1, wherein the shaft of the column includes a plurality of sides, and the attachment faces are recessed inward relative to the sides of the shaft.

20. The system of claim 1, further comprising:
a plurality of pilings extending downwardly into the ground, each one of the at least four columns being coupled to a respective one of the plurality of pilings.

21. The system of claim 1, wherein the support ledge is formed with a width that is at least as large as a width of the shaft of the column.

22. A method of elevating a building structure above a foundation and above grade using a plurality of beams and columns assembled into a moment frame, each beam having a transverse attachment flange at each of the respective ends thereof, each column having a base at one end configured to couple with said foundation, a generally square upper fixture at another end thereof defining four attachment faces, a shaft extending between the base and the upper fixture, and a single support ledge projecting outwardly from each of the four attachment faces and positioned between the shaft and the attachment faces, wherein each of the attachment faces of the upper fixture of each column defines an outer surface that is disconnected from the outer surface of an adjacent attachment face such that the attachment faces collectively define a discontinuous outer surface of the upper fixture, the attachments flanges and the attachment faces having corresponding patterns of bolt-receiving apertures, the method comprising:
coupling the base of each of the columns with the foundation;
securing at least four of the columns with at least two of the beams per column, whereby securing each of the at least four columns includes:
placing an attachment flange of a first beam into confronting relationship with a first attachment face of the column and placing an attachment flange of a second beam into confronting relationship with a second attachment face of the column,
aligning a plurality of the apertures of each of the confronting attachment flanges of the first and second beams with a respective plurality of the apertures of the confronting first and second attachment faces of the column,
directly contacting and supporting the confronting attachment flanges of the first and second beams with the support ledge, and
positioning at least one first bolt through a respective at least one pair of the aligned apertures of the confronting attachment flange of the first beam and the confronting first attachment face of the column, and positioning at least one second bolt through a respective at least one pair of the aligned apertures of the confronting attachment flange of the second beam and the confronting second attachment face of the column, thereby forming the moment frame; and placing the building structure on the moment frame and supporting the building structure with the moment frame.

23. The method of claim 22, wherein each attachment face of each column and each attachment flange of each beam includes four or fewer apertures, and wherein positioning the at least one first bolt includes positioning four of fewer first bolts through respective four or fewer pairs of aligned apertures, and positioning the at least one second bolt includes positioning four of fewer second bolts through respective four or fewer pairs of aligned apertures.

24. The method of claim 22, wherein the base of each column includes a lower base portion and an upper base portion, and wherein coupling the base of each of the columns with the foundation includes coupling the lower base portion with the foundation, and coupling the upper base portion with the lower base portion.

25. The method of claim 22, further comprising:
preparing the foundation before coupling the base of each of the columns with the foundation.

26. The method of claim 25, wherein preparing the foundation includes forming a concrete foundation member.

27. The method of claim 26, wherein preparing the foundation further includes installing a plurality of pilings into the ground before forming a concrete foundation member.

28. The method of claim 27, wherein forming a concrete foundation member includes embedding a pile cap of each piling in the concrete foundation member.

29. The method of claim 27, wherein each piling includes helical flighting.

30. The method of claim 25, wherein preparing the foundation includes forming a foundation framework including a plurality of attachment members and a plurality of beams extending between and secured with the attachment members, installing a plurality of pilings into the ground, and securing each of the pilings with an attachment member.

31. The method of claim 30, wherein each attachment member includes a lower plate and each piling includes a pile cap having a pile cap plate, and securing each of the pilings with an attachment member includes securing a pile cap plate with a lower plate.

32. The method of claim 30, wherein each attachment member includes an upper plate, and coupling the base of each column with the foundation includes securing a base with the upper plate.

33. The method of claim 30, wherein each piling includes helical flighting.

34. The method of claim 22, further comprising:
securing the building structure with said moment frame using a plurality of tie-down plates, the tie-down plates and attachment faces of each column having corresponding patterns of bolt-receiving apertures such that a tie-down plate and any one of the attachment faces of any one of the columns can be placed into confronting relationship and secured together by bolts received in the respective apertures of the confronting tie-down plate and attachment face.

35. The method of claim 22, further comprising:
securing an elevated platform assembly with said moment frame, the elevated platform assembly providing a platform surface elevated from the foundation.

36. The method of claim 35, wherein securing an elevated platform assembly includes securing cantilevered beams with respective columns of the moment frame and supporting a platform element on the cantilevered beams, the platform element providing the platform surface.

37. An assembly for supporting a building structure above grade, comprising:
the system of claim 1,
wherein the foundation includes a plurality of pilings extending downwardly in the ground.

38. The assembly of claim 37, the foundation further including a concrete foundation member.

39. The assembly of claim 38, the plurality of pilings being coupled with the concrete foundation member.

40. The assembly of claim 39, each piling including a pile cap embedded in the concrete foundation member.

41. The assembly of claim 39, each piling including helical flighting.

42. The assembly of claim 37, the foundation further including a foundation framework comprising a plurality of attachment members and a plurality of beams extending between and secured with the attachment members, each of the plurality of pilings being coupled with an attachment member.

43. The assembly of claim 42, each attachment member including a lower plate and each piling including a pile cap having a pile cap plate, the lower plates of the attachment members being secured with the pile cap plates.

44. The assembly of claim 42, each piling including helical flighting.

45. The assembly of claim 42, each attachment member including an upper plate, the base of each column being secured to an upper plate.

46. The assembly of claim 42, each attachment member providing four attachment faces, and each of the beams of the foundation framework having a transverse attachment flange at respective ends thereof, the attachment faces of the attachment member and the attachment flanges of the beams of the foundation framework having corresponding patterns of bolt-receiving apertures such that either attachment flange of any one of the beams of the foundation framework and any one of the attachment faces of the attachment members can be placed into confronting relationship with a plurality of apertures of each of the confronting attachment flange of the beam of the foundation framework and the attachment face of the attachment member aligned in order to be secured together by bolts received in one or more of the aligned apertures.

47. The assembly of claim 37, further comprising an elevated platform assembly secured to the moment frame and providing a platform surface elevated from the foundation.

48. The assembly of claim 47, the elevated platform assembly including at least two cantilevered beams secured to respective columns of the moment frame and a platform element supported by the cantilevered beams and providing the platform surface.

49. The assembly of claim 48, each cantilevered beam including an upper member, and the platform element including grating sitting on the upper members.

* * * * *

UNITED STATES PATENT AND TRADEMARK OFFICE
CERTIFICATE OF CORRECTION

| | | |
|---|---|---|
| PATENT NO. | : 9,249,593 B2 | Page 1 of 1 |
| APPLICATION NO. | : 14/224369 | |
| DATED | : February 2, 2016 | |
| INVENTOR(S) | : Howard A. Perko et al. | |

It is certified that error appears in the above-identified patent and that said Letters Patent is hereby corrected as shown below:

In the Specification:

Column 2
Line 3 reads "...the attachments flanges of the beams..." and should read -- the attachment flanges of the beams --

Column 3
Lines 38-39 reads "...in accordance with further the principles of the prevent invention." and should read -- ...in accordance with further principles of the present invention --

Column 3
Line 45 reads "FIG. 7 is a side view of column of the..." and should read -- FIG. 7 is a side view of a column of the --

Column 9
Line 52 reads "...the same beam 14 or 70 can be used..." and should read -- ...the same beam 14 or 170 can be used... --

In the Claims:

Claim 13, Column 13
Lines 36-39 reads "The system of claim 1, further comprising: an elevated platform assembly, wherein when the beams and columns are assembled into the moment frame, and the elevated platform assembly provides a..." and should read -- "The system of claim 1, further comprising: an elevated platform assembly, wherein when the beams and columns are assembled into the moment frame, the elevated platform assembly provides a... --

Signed and Sealed this
Tenth Day of May, 2016

Michelle K. Lee
*Director of the United States Patent and Trademark Office*